Figures 1, 2:
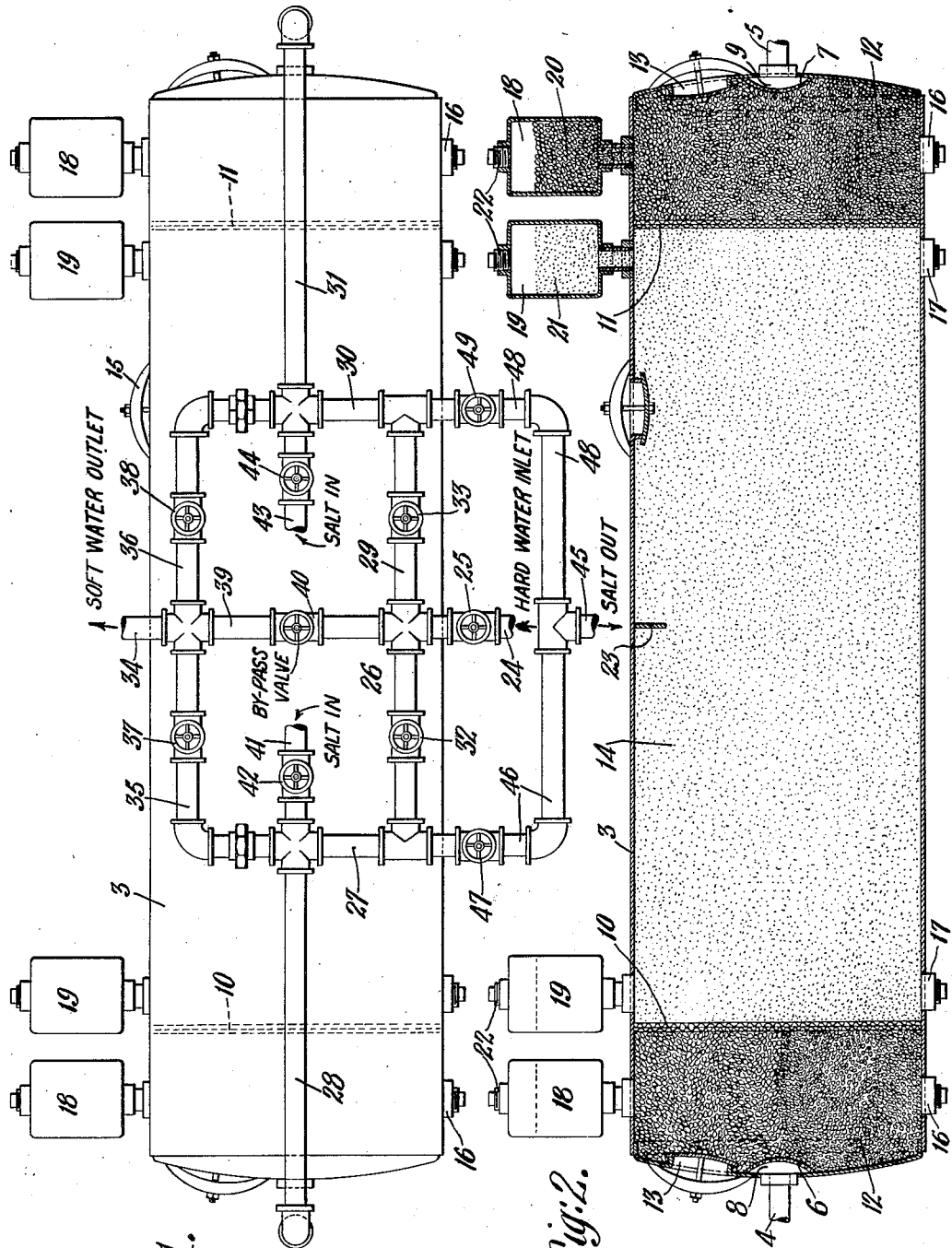

March 24, 1931.  G. S. APELDORN  1,797,709
BASE EXCHANGE WATER SOFTENER
Filed Sept. 7, 1929

INVENTOR
Guy Scott Apeldorn
BY
Synnestvedt & Lechner
ATTORNEYS

Patented Mar. 24, 1931

1,797,709

UNITED STATES PATENT OFFICE

GUY SCOTT APELDORN, OF PHILADELPHIA, PENNSYLVANIA

BASE-EXCHANGE WATER SOFTENER

Application filed September 7, 1929. Serial No. 390,874.

The present invention relates to apparatus for softening water by what is known as the base exchange method, such apparatus customarily involving the use of a tank containing a bed of the exchange material and provided with suitable pipe connections by means of which the hard water can be passed through the exchange material and delivered to the point of use in a softened condition. Such apparatus also involves the provision of suitable connections for introducing the regenerating solution and for subsequently removing it.

The principal objects of my invention include the provision of an apparatus of the foregoing character which will make possible greatly increased softening capacity for a given size equipment; the provision of an apparatus which, by greatly increasing the efficiency of a given water softening installation, will materially lower the cost, both of the installation and of operation per unit of softened water; the provision of an apparatus in which it is unnecessary to use distributing mechanism in the form of the conventional radiating conduits provided with a plurality of small outlet openings; the provision of an apparatus in which uniform and even distribution throughout the bed of exchange material is effected by virtue of a uniform resistance throughout the mass of the material in the direction of flow; the provision of an apparatus in which there is practically no motion of the particles of base exchange material, thereby preventing attrition losses; the provision of an apparatus in which the zeolite bed is confined and tightly packed in its chamber, together with means for constantly and automatically adding to the supply of material in the zeolite chamber to compensate for the normal shrinkage which occurs in usage, particularly during the early stages after the bed has been placed in operation; the provision, in association with the object just recited, of an apparatus in which dirt, sediment or foreign matter present in water will penetrate but slightly, if at all, into the bed of exchange material, and also of an apparatus in which whatever foreign matter does collect in the zeolite can be easily and quickly removed without the necessity of taking the apparatus out of service for the customary back washing operation; and the provision of filtering material, the supply of which is constantly maintained as in the case of the exchange material.

More specifically stated, my invention contemplates the provision of a base exchange water softener in which the flow of the liquids takes place in a substantially horizontal direction and in which it is unnecessary to provide a bottom drain for the removal of the brine solution. In connection with this object it is also an object of my invention to maintain a reserve supply of filtering material and of exchange material outside the flow line through the tank, which supplies are in constant communication with the materials in the flow line and which constantly press against them so as to maintain the respective chambers substantially full at all times.

How the foregoing, together with such other objects as may appear hereinafter, or are incident to my invention, can be obtained are illustrated in a preferred form in the accompanying drawings, wherein—

Fig. 1 is a side elevation of my improved apparatus with the pipe connections illustrated diagrammatically, and Fig. 2 is a vertical longitudinal section through the apparatus of Fig. 1.

Referring to the drawing, it will be seen that my improved apparatus includes a tank 3 having suitable pipe connections 4 and 5 oppositely disposed and so arranged as to make possible a circulation through the tank in a substantially horizontal direction. On the interior of the tank adjacent the connections 4 and 5 and spaced away therefrom are what I have termed guard screens 6 and 7 which provide collecting chambers 8 and 9 for the fluids to be passed through the tank. To the inside of these guard screens and spaced somewhat therefrom I arrange what I have called retaining screens 10 and 11. It is obvious that the two screens at each end of the casing 3 cooperate to form chambers which are completely filled with suitable filtering material, such as quartz, sand, pebbles, or the like, and which I have identified on the drawing by the reference character 12. A manhole and cover plate construction 13 provide a means for giving access to the filter chambers when necessary.

Between the two retaining screens 10 and 11 is a relatively large chamber completely filled with the base exchange material or zeolite 14, access to this chamber and the material therein being had through the manhole and cover plate construction 15.

At this point I wish to call attention to the fact that the screens 10 and 11 are arranged in parallel relation, and that they are of substantially equal area so that the areas of contact between the zeolite and the filtering material at each end of the casing are substantially equal. Furthermore, the mass of the zeolite or bed of exchange material is substantially uniform in cross section from end to end in the direction of flow through the tank. This provision insures uniform resistance throughout the bed of zeolite, so that no portion of it will be short circuited during operation of the device.

At the bottom each filter chamber is provided with a plugged opening 16 and the zeolite chamber with a pair of plugged openings 17. More such openings can be provided if required, and in case it is necessary to remove either the zeolite or the filtering material, or both, all that has to be done is to shut off the water and remove the plugs, the material then flowing out under the influence of gravity.

Beyond, that is, to the outside of the flow line through the tank, and preferably on the outside of the tank itself, I provide what can be termed reserve storage compartments 18 and 19, the compartments 18 being in open communication with the filter chambers and the compartments 19 in open communication with the zeolite chambers. In the present instance I have shown one compartment 18 for each filter chamber and two compartments 19 for each zeolite chamber, one of the latter of which is located near each end of the zeolite chamber. Here, again, it is obvious that additional chambers can be utilized if necessary or desirable.

These chambers carry reserve or dead bodies or masses of the filtering material and of the base exchange material. That is, the reserve filtering material 20 in the compartments 18 and the reserve zeolite 21 in the compartments 19 do not actively perform either a filtering function or a softening function during operation of the device, but by virtue of the fact that they are in open communication with the interior of the tank, the material which they contain constantly presses against the material in the tank. In this way each filtering chamber and the zeolite chamber is maintained completely full of material, so that there will be no void spaces through which the water can short circuit during operation of the softener. The storage compartments are provided with suitably plugged openings 22 through which additional material can be added when necessary.

I here wish to call attention to the fact that although I prefer the arrangement illustrated, it is not absolutely necessary that the compartments 20 and 21 or their equivalent be located outside the tank proper, as it would be entirely possible to provide a downwardly extending baffle 23 or a series of them, so that that portion of the material which comes between the bottom edges of such baffle and the top wall of the casing could act as a reserve or dead body of material outside the flow line through the tank, the upper flow line in such an arrangement being determined by the bottom edges of the plates 23. In such a construction there would have to be, of course, suitable openings in the upper wall of the tank for each compartment created by the plates 23. In other words, the feature which I wish to stress is the one involved in providing a reserve of material outside the flow line which is constantly forced toward the main body of material which is performing the softening function or the filtering function, as the case may be, so that at no time will there be a void space through which the water can short circuit.

I prefer to arrange the apparatus so that both the hard water and the regenerating solution can be circulated through the tank in either direction, and to this end I provide the following piping. The hard water enters through the pipe 24 under the control of a valve 25, and by means of the connecting pipes 26, 27 and 28 or the connecting pipes 29, 30 and 31 it is possible to deliver the hard water to either end of the casing as may be desired, the valves 32 and 33 providing the necessary control.

The soft water is delivered through the conduit 34 connected by pipes 35 and 28 to one end of the casing and by pipes 36 and 31 to the other end of the casing, the necessary control in this instance being by means of the valves 37 and 38. A by-pass pipe 39 may be provided so that the hard water inlet 24 can be directly connected to the soft water outlet 34 should occasion demand, and this by-pass pipe is controlled by the valve 40.

Connected to the pipe 28 is a salt water inlet pipe 41 under the control of valve 42 and connected to the pipe 31 is another salt water inlet pipe 43 under the control of valve 44. The salt or regenerating solution passes outwardly through the conduit 45 which is connected to the pipes 27 and 28 on one side by the pipe 46 under the control of valve 47 and at the other side by the pipe 48 under the control of valve 49.

The operation of the device is as follows: Assuming that the water is to be circulated in the first instance in a left to right direction, all the valves, except valves 25, 32 and 38, are closed so that the water will enter at the left hand end of the casing, pass out at the right hand end and be delivered to the soft water line 34 through the pipes 31 and 36. If the circulation is to take place in the reverse direction, all the valves are closed, with the exception of valves 25, 33 and 37, so that the water will enter the right hand end of the tank through the pipe 31 and connection 5, pass out of the left hand end through connection 4 and pipe 28 and be delivered to the soft water outlet 34 through the pipe 35.

A regenerating operation can also be effected in either direction. If in a left to right direction, all valves, with the exception of valves 42 and 49, are closed, and if in a right to left direction, all valves, with the exception of valves 44 and 47, are closed. The salt is wished out after the regeneration is complete by introducing hard water through the inlet 24 in one direction or the other, as may be desired, in order to force the salt out as just described.

It will be seen, therefore, that with my improvements the bed of exchange material, as well as the body of filtering material at each end thereof, are constantly and automatically maintained in a tightly packed condition. This feature, is cooperation with the equal areas of contact between the zeolite bed and the uniform cross-section of the bed, prevents the creation of void spaces and obviates short circuiting or cavitation and ensures uniform and even distribution of the flow and complete utilization of the softening capacity of the bed. The resistance through the softener is always uniform so that the water or brine will always be evenly distributed throughout the mass. No distributors are necessary, inasmuch as the construction of the apparatus is such as to ensure the even and uniform flow referred to, because the resistance through the device is the same at all points and is constantly maintained so by the reserve bodies of materials.

The tightly packed condition of the zeolite prevents attrition because it reduces to a minimum the amount of motion possible among the particles, and the tightly packed condition further acts to prevent whatever foreign matter may pass through the filter from penetrating to any considerable extent into the body of the zeolite. In which connection I prefer to reverse the flow of the hard water through the tank between each regeneration so that whatever foreign matter is filtered out during one cycle is passed out through the line during the reversing cycle. In this way the machine need never be taken out of use for a cleaning or back washing operation.

I claim:—

1. A base exchange water softener comprising a tank, opposed connections for circulating fluids therethrough in a substantially horizontal direction, a chamber between said connections completely filled with exchange material, a storage compartment above the flow line through the tank in open communication with the chamber for the exchange material, and a supply of exchange material in said compartment pressing down upon the material in said chamber.

2. A base exchange water softener comprising a tank, opposed connections for circulating fluids therethrough, a chamber between said connections completely filled with exchange material, a storage compartment outside the flow line through the tank in open communication with said chamber, and a supply of exchange material in said compartment pressing against the material in said chamber, the mass of exchange material in said chamber being of substantially uniform cross section in the direction of flow and having its inlet and discharge areas substantially equal.

3. A base exchange water softener comprising a tank, opposed connections for circulating fluids therethrough, a guard screen over each connection providing a collection chamber, a retaining screen to the inside of each collection chamber creating a filter chamber with the guard screen, filtering material completely filling each filter chamber, base exchange material completely filling the inner chamber between the retaining screens, a storage compartment for each chamber outside the flow line through the tank in open communication with its chamber, a supply of filtering material in each filter storage compartment pressing against the filtering material in its chamber, and a supply of exchange material in the exchange material storage compartment pressing against the exchange material in its chamber.

4. A base exchange water softener comprising a tank, opposed connections for circulating fluids therethrough, a guard screen over each connection providing a collection chamber, a retaining screen to the inside of each collection chamber creating a filter chamber with the guard screen, filtering material completely filling each filter chamber, base exchange material completely filling the inner chamber between the retaining screens, a storage compartment for each chamber outside the flow line through the tank in open communication with its chamber, a supply of filtering material in each filter storage compartment pressing against the filtering material in its chamber, and a supply of exchange material in the exchange material storage compartment pressing against the exchange material in its chamber, the mass of exchange material in said chamber being of substantially uniform cross section in the direction of flow and having its inlet and discharge areas substantially equal.

5. A base exchange water softener comprising a tank, opposed connections for circulating fluids therethrough, a chamber between said connections completely filled with exchange material, a storage compartment outside the flow line through the tank in open communication with said chamber, and a supply of exchange material in said compartment pressing against the material in said chamber, the inlet and discharge areas of said bed of exchange material being substantially equal.

6. A base exchange water softener comprising a tank, opposed connections for circulating fluids therethrough, a chamber adjacent each connection completely filled with filtering material, a chamber between said filtering chambers completely filled with exchange material, and a reserve body of each material outside the flow line in constant contact with and adapted to press against the material in the flow line.

7. A base exchange water softener comprising a tank, opposed connections for circulating fluids therethrough, a chamber adjacent each connection completely filled with filtering material, a chamber between said filtering chambers completely filled with exchange material, and an opening to each chamber through which the material therefor can be fed whereby to keep it completely filled at all times, together with means automatically feeding a supply of material through each opening.

8. A base exchange water softener comprising a tank, opposed connections for circulating fluids therethrough in a substantially horizontal direction, a guard screen over each connection providing a collection chamber, a retaining screen to the inside of each collection chamber creating a filter chamber with the guard screen, filtering material completely filling each filter chamber, base exchange material completely filling the inner chamber between the retaining screen, a storage compartment for each chamber above the flow line through the tank in open communication with its chamber, a supply of filtering material in each filter storage compartment pressing against the filtering material in its chamber, and a supply of exchange material in the exchange material storage compartment pressing against the exchange material in its chamber.

9. A base exchange water softener comprising a tank, opposed connections for circulating fluids therethrough in a substantially horizontal direction, a guard screen over each connection providing a collection chamber, a retaining screen to the inside of each collection chamber creating a filter chamber with the guard screen, filtering material completely filling each filter chamber, base exchange material completely filling the inner chamber between the retaining screens, a storage compartment for each chamber above the flow line through the tank in open communication with its chamber, a supply of filtering material in each filter storage compartment pressing against the filtering material in its chamber, and a supply of exchange material in the exchange material storage compartment pressing against the exchange material in its chamber, the mass of the exchange material having its areas of contact with the filtering chambers substantially equal.

10. A base exchange water softener comprising a tank, opposed connections for circulating fluids therethrough in a substantially horizontal direction, a chamber between said connections completely filled with exchange material, and a reserve body of exchange material above the flow line through the tank in constant contact with and adapted to press down upon the material which is in the flow line.

11. A base exchange water softener comprising a tank, opposed connections for circulating fluids therethrough in a substantially horizontal direction, a chamber between said exchange material, and a reserve body of exchange material outside the flow line through the tank in constant contact with and adapted to press against the material in the flow line, the mass of material in said chamber having its inlet and discharge areas substantially equal.

In testimony whereof I have hereunto signed by name.

GUY SCOTT APELDORN.